US008543684B2

(12) United States Patent
Hulusi et al.

(10) Patent No.: US 8,543,684 B2
(45) Date of Patent: Sep. 24, 2013

(54) METHOD FOR COMPUTING THE ENTROPIC VALUE OF A DYNAMICAL MEMORY SYSTEM

(75) Inventors: Tam Hulusi, Santa Ana, CA (US); Robert Wamsley, Golden, CO (US)

(73) Assignee: Assa Abloy AB, Stockholm (SE)

( * ) Notice: Subject to any disclaimer, the term of this patent is extended or adjusted under 35 U.S.C. 154(b) by 607 days.

(21) Appl. No.: 12/166,221

(22) Filed: Jul. 8, 2008

(65) Prior Publication Data

US 2009/0055911 A1  Feb. 26, 2009

Related U.S. Application Data

(63) Continuation-in-part of application No. 12/120,075, filed on May 13, 2008, now abandoned.

(60) Provisional application No. 60/968,009, filed on Aug. 24, 2007.

(51) Int. Cl.
*G06F 15/173* (2006.01)

(52) U.S. Cl.
USPC ............... 709/224; 709/223; 726/23; 726/6; 340/10.1; 340/10.2; 370/230

(58) Field of Classification Search
USPC .......................................... 709/223; 370/230
See application file for complete search history.

(56) References Cited

U.S. PATENT DOCUMENTS

| 7,788,722 | B1* | 8/2010 | Njemanze et al. ............... 726/23 |
| 7,978,050 | B2* | 7/2011 | Moshfeghi .................... 340/10.2 |
| 7,983,211 | B2* | 7/2011 | Lovegren et al. ............. 370/328 |
| 2003/0179703 | A1* | 9/2003 | Levy et al. .................... 370/230 |
| 2008/0163361 | A1 | 7/2008 | Davis et al. |
| 2009/0135817 | A1 | 5/2009 | Hulusi et al. |
| 2009/0225739 | A1* | 9/2009 | Yeo et al. ...................... 370/345 |

FOREIGN PATENT DOCUMENTS

| EP | 1026855 | 8/2000 |
| EP | 1351441 | 10/2003 |
| EP | 2031801 | 3/2009 |

OTHER PUBLICATIONS

Beaufour et al., "Smart-tag based data dissemination," Proceeding of the 1st ACM International Workshop on Wireless Sensor Networks and Applications, Sep. 2002, pp. 68-77.
Callaway et al., "Are randomly grown graphs really random?," Physical Review E, vol. 64(4), 2001, 7 pages.
Carreras et al., "A Framework for Opportunistic Forwarding in Disconnected Networks," 2006 Third Annual International Conference on Mobile and Ubiquitous Systems: Networking & Services, Jul. 2006, pp. 1-8.
De Aguiar et al., "Spectral analysis and the dynamic response of complex networks," Physical Review E, vol. 71, 2005, 5 pages.
Erdos et al. "On Random Graphs I," 1959, pp. 290-297.
Farkas et al., "Networks in life: scaling properties and eigenvalue spectra," Physica A, vol. 314, 2002, pp. 25-34.

(Continued)

*Primary Examiner* — Kyung H Shin
(74) *Attorney, Agent, or Firm* — Sheridan Ross P.C.

(57) ABSTRACT

Methods, devices, and systems are provided for optimizing the dissemination of information in various types of systems such as an access control system. More specifically, there are provided various mechanisms to increase the efficiency with which system updates and other types of information are spread throughout an access control system having at least one non-networked reader.

27 Claims, 11 Drawing Sheets

(56) References Cited

OTHER PUBLICATIONS

Glance et al., "Pollen: using people as a communication medium," Computer Networks, vol. 35(4), Mar. 2001, pp. 429-442.
Goh et al., "Spectra and eigenvectors of scale-free networks," Physical Review E, vol. 64, 2001, 5 pages.
Newman al., "Random graphs with arbitrary degree distribution and their applications," Physical Review E, vol. 64, 2001, 17 pages.
Ramasco et al., "Self-organization of collaboration networks," Physical Review E, vol. 70, 2004, 10 pages.
Sanchez et al., "Waiting-time statistics of self-organized-criticality systems," Physical Review Letters, vol. 88, No. 6, 2002, 4 pages.
"The Oracle of Bacon at Virginia, From Various Articles About the Oracle," Computer Science at the University of Virginia, available at http://www.cs.virginia.edu/misc/news-bacon.html, 1996, accessed on Oct. 21, 2010, 8 pages.
Watts et al., "Collective dynamics of 'small-world' networks," Nature, vol. 393, 1998, pp. 440-442.
Partial European Search Report for European Patent Application No. 08162494.2, dated Nov. 16, 2009.
Extended European Search Report for European Patent Application No. 08162494.2, dated Feb. 1, 2010.
Official Action for European Patent Application No. 08162494.2, dated Jul. 13, 2010.
Official Action for European Patent Application No. 08162494, dated May 17, 2011.

* cited by examiner

METHOD FOR COMPUTING THE ENTROPIC VALUE OF A DYNAMICAL MEMORY SYSTEM

CROSS REFERENCE TO RELATED APPLICATIONS

This application is a Continuation-in-Part of U.S. patent application Ser. No. 12/120,075, filed on May 13, 2008, and also claims the benefit of U.S. Provisional Application No. 60/968,009, filed Aug. 24, 2007, the entire disclosures of which are hereby incorporated herein by reference.

FIELD OF THE INVENTION

The present invention relates generally to access control systems, devices, and methods. More specifically, the present invention is directed toward the dissemination of information in an access control system having at least one non-networked reader.

BACKGROUND

Control access systems have historically been completely interconnected by wired and/or wireless connections. More specifically, readers and other types of message hosts are generally in communication with a centralized control system such as a centralized control panel. The interconnectedness of the system allows policy updates to be quickly and efficiently disseminated throughout the access control system. If a policy update (e.g., sending new access permissions to all readers) is necessary, then the centralized control panel would send a message to the networked message hosts notifying them of the new policy.

While these completely interconnected systems help to facilitate efficient policy updates they are expensive to install and maintain, especially in large facilities where a significant amount of wire and/or wireless communication devices are required to have each message host in communication with the centralized control panel. Thus, non-networked message hosts (i.e., message hosts which are not in communication with a centralized control system via a direct communication path or message hosts that have a communication path that becomes unavailable), which are also referred to as local hosts, are becoming more desirable due to their autonomy and the low cost associated with their installation and maintenance. The downside to installing non-networked message hosts is that it becomes more difficult to ensure that the non-networked message host receives policy updates.

SUMMARY

Colonies in control access systems lacking long range or direct communication between message hosts can propagate messages between message hosts by means of an intermediary message carrier. Message hosts are typically stationary objects, such as an access control reader. Message carriers are typically mobile objects, such as an access control token. A message object contains data or information, such as access control policies, that can be understood and used by the message hosts. Message objects can originate at one or more message hosts and can be used by message hosts to perform an action, such as grant access to a secure area. A message object can be introduced utilizing one or more existing members from any colony or can be newly introduced colony members. In a system containing a colony of message hosts and a colony of message carriers, the message carriers can transport a message from one message host to another, thereby propagation the message object among the colony of message hosts.

A message originating on one or more message hosts can be conveyed from the message host to a message carrier when the message host and message carrier are in close proximity to each other. If a second message carrier is subsequently put in close proximity to a message host originating a message object, the message object can be conveyed from the message host to the second message carrier. A message carrier, after gaining knowledge of the message object, can transport the message object from a message host with knowledge of the message object, such as a message host that originates a message object, to a second message host with no knowledge of the message object and then convey the message object from the message carrier to the second message host when the message carrier is in close proximity to the second message host. After the message object is conveyed to the second message host, the second message host has knowledge of the message object.

Two colony systems are used, for example, in disconnected access control models. Such systems provide a simple and elegant solution for access control without the need to connect readers to a wired network. These systems provide a secure and elegant solution to access control when cost or installation of a wired network is undesirable. While these systems have been in use for more than twenty years, the optimization of these systems has not yet been achieved.

It is therefore one aspect of the present invention to improve on the current state of the art by providing a useful, concrete, and tangible result that can be used to understand and design optimal communication in two colony systems. This program can be applied more generally to the understanding and optimization of such two colony systems that rely on message carriers to deliver message objects to non-networked message hosts.

Embodiments of the present invention define a metric that provides a measure of information dissemination performance in a system having message hosts that can communicate with each other using a message carrier as an intermediary. Exemplary systems of the type described here are mail delivery where a message, in the form of a letter, is carried from one location to another or, in nature, a colony of bees that carry pollen from one plant to another. What these systems have in common is that a network is formed by the message carriers. The network is comprised of transient and asymmetrical connections between the hosts. A high performance system is defined here as one that is capable of efficient delivery of a message by the message carriers and distributed among the hosts. At least one embodiment of the present invention provides a method of measuring information dissemination efficiency in these systems and, when possible, to improve that efficiency.

Small World networks are characterized by localized networks that are connected to each other by critical links that provide a shortcut between otherwise distant or unconnected clusters. One popular example is the Kevin Bacon game where the goal is to find a path between any movie actor and Kevin Bacon using appearances in the same movies as connections. Connections between local clusters (movies) are made by an actor that appears in both movies.

An important difference between the actor network in the Kevin Bacon game and a network defined by message hosts and message carriers in an access control system is that a connection made by two actors appearing in the same movie is permanent and bidirectional, while the connection between two message hosts in our system is a transient and unidirectional event. This difference requires a slightly different tactic than the one typically used to study Small World networks. Rather than treating the message carrier population as vertices and the message hosts as edges, or the other way around, two distinct populations are both treated as vertices while the conveyance of a message object between these populations is treated as an edge.

This difference requires modifications to many of the standard graph-theory tools used to study networks. For example, if treated like a standard network, a degree distribution would be defined using the connections from message host-to-host; but in accordance with at least some embodiments of the present invention, the degree distribution will describe connections from message host-to-carrier and message carrier-to-host.

Related to the degree distribution, an adjacency matrix will not be a square n×n lattice but will have dimensions with the number of message carriers on one side and the number of message hosts on the other. Because each event is effectively a half-step in the process of sharing a message object between two like components, the traditional adjacency matrix can be found by squaring the matrix of the two vertex system.

Another consequence of the transient connection is that the connection defined in an adjacency matrix must be replaced with a probability weight representing connection strength to create a weighted adjacency matrix. A Markov Chain Monte Carlo based on a modeled weighted adjacency matrix can be used to simulate the propagation of message objects in the two-colony system. The message-carrier-to-message-host weighted adjacency matrix, W, is the engine that describes the information flow in this two colony network.

In one embodiment, a method is provided, the method generally comprising:

receiving message host information;

receiving message carrier information, wherein message carriers are operable to carry message objects between message hosts;

analyzing, with a network analysis module, the message host and message carrier information to determine at least one of (i) an amount of time required for a first message object to be communicated to a predetermined number of message hosts and/or a predetermined number of message carriers and (ii) a number of message hosts and/or message carriers that will receive the first message object within a predetermined amount of time; and providing, with the network analysis module, an output to a user indicating results of the analyzing step.

It is one objective of the present invention to provide a secure access control system capable of working with non-networked message hosts (i.e., readers which contain no wired connection to a centralized database and operate quasi autonomously).

A Markov Chain Monte Carlo model may be used to examine the performance of a colony of message carriers to distribute message objects among a colony of message hosts. A performance measure may be defined to estimate the chance that an update will not reach its target before it is needed.

Disconnected access control networks may be modeled as two separate but interdependent populations, message carriers and message hosts. The interdependence is created because each population can only receive information from the other population when there is no direct message carrier-to-message carrier or door-to-door events, resulting in coupled partial differential equation.

Relationships found in disconnected networks may include a scaling for the total number of connections that follows the geometric mean of the number of message carriers and message hosts. In accordance with at least some embodiments of the present invention, connection strengths between message carriers and message hosts follow a Zipf-Mandelbrot distribution with a power of 2.

Security entropy of the system can be defined as a measure of the state-of-order for the system, for example it might be defined as the probability that an update will miss its target given a time dependent system state. The security entropy can be calculated and compared to sampled access control data and can be used to measure the security value against a system performance benchmark. Security entropy of a completely connected system would be zero, indicating that the system is fully updated. Disconnected or partially connected systems will have a security entropy that can be greater than zero. Remedies to reduce the security entropy and thereby improve system performance can also be proposed. Such proposals may include suggestions to alter a proposed configuration of message hosts (e.g., by altering the number, location, and/or network communication capabilities of the hosts) and message carriers (e.g., by altering the number, type, and permissions of carriers).

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary access control system. Although well suited for use with, e.g., a system using access control readers and/or credentials, the invention is not limited to use with any particular type of access control system or configuration of system elements. Those skilled in the art will recognize that the disclosed techniques may be used in any data messaging application in which it is desirable to optimize information dissemination throughout the network.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Embodiments of the present invention are generally directed toward devices and methods of using such devices in a secure access system. Although well suited for use in systems and methods employing RF communication protocols, embodiments of the present invention may be suitable for use in systems employing other communication protocols including, but not limited to, optical communication protocols, magnetic communication protocols, chemical messaging, and the like.

Figure 1:
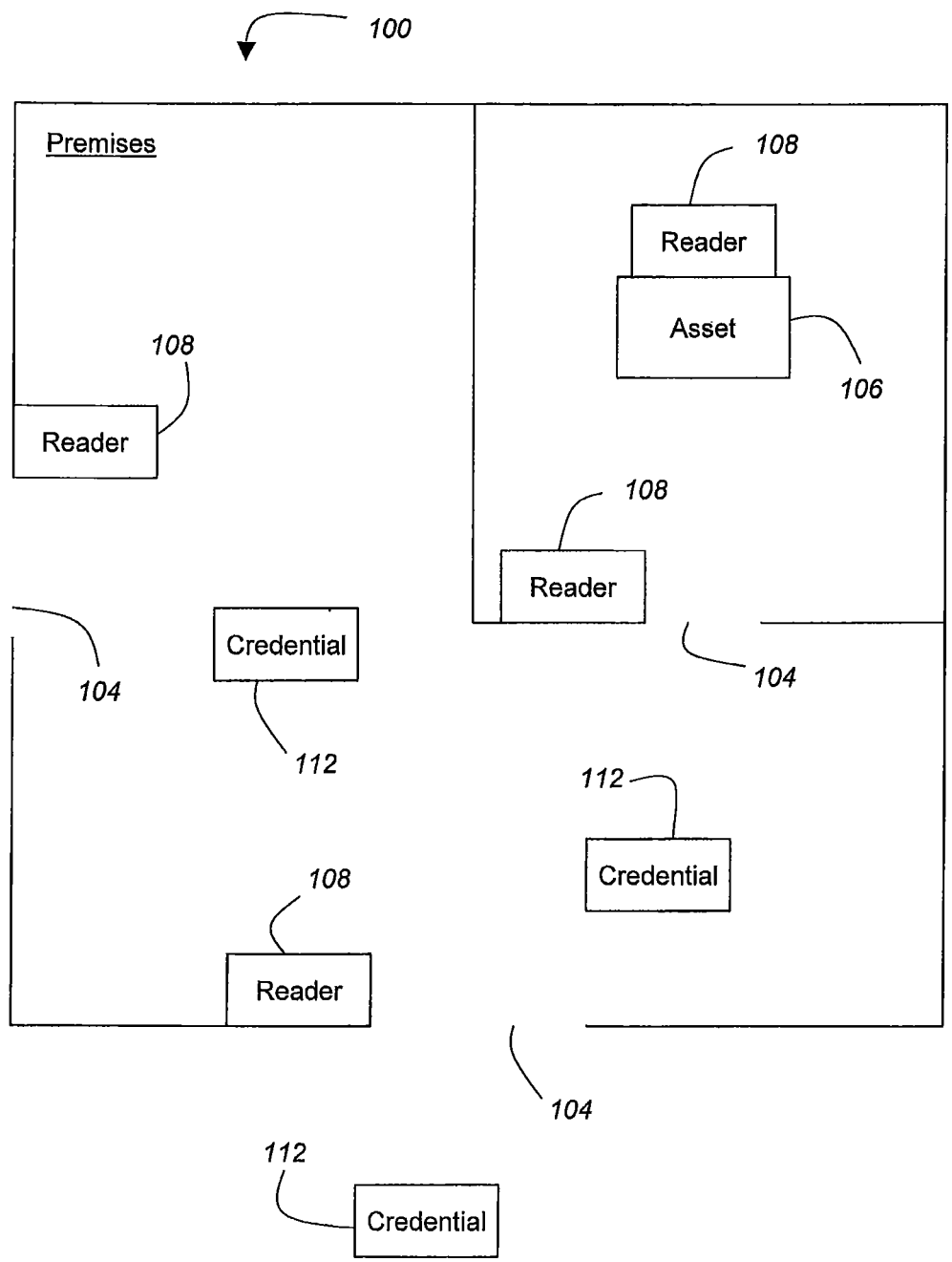
FIG. 1 depicts a secured premises in accordance with embodiments of the prior art.

Referring initially to FIG. 1, a secured premises 100 will be described in accordance with at least some embodiments of the present invention. The secured premises 100 displayed may correspond to an actual premises having access control equipment. Alternatively, the secured premises 100 may be simulated and the depicted location of the equipment may correspond to possible locations. For example, the premises may be displayed on a user interface of a computing station such as a personal computer, laptop, or the like and each of the pieces of access control equipment may represent actual equipment that may be used on a real premises.

In accordance with at least one embodiment of the present invention, the secured premises 100 may comprise a plurality of access points 104 each having a message host associated therewith. The access points 104 may comprise points of access to the interior of the premises 100. Alternatively, the access points 104 may comprise points of access to rooms within the premises 100.

In the depicted embodiment, message hosts correspond to access control readers 108. In addition to access points 104, the premises 100 may comprise one or more assets 106. Examples of assets 106 may include secured computing resources (e.g., databases, computers, laptops, servers, etc.), financial resources (e.g., bank accounts, credit accounts, financial information, etc.), physical resources (e.g., office equipment, safes, files, etc.).

The assets 106 may also comprise a corresponding message host to control/restrict/monitor access to the asset 106. In accordance with at least some embodiments of the present invention, the readers 108 may be used to control a user's access through an associated access point 104 or to an associated asset 106. A user may be issued a credential 112, which can be presented to a reader 108 when a user desires access through an access point 104 or to an asset 106. The credentials 112 may comprise authentication information that can be wirelessly communicated to the readers 108 for verification of the user's access permissions. When a reader 108 verifies that a valid credential 112 has been presented thereto, the reader 108 may then permit the user access to the associated access point 104 and/or asset 106. In accordance with at least one embodiment of the present invention access control decision may be made on the credentials 112 rather than the readers 108. Further details of such an embodiment where decisions can be made on the credential 112 are described in U.S. patent application Ser. No. 11/778,145, entitled "Method and Apparatus for Making a Decision on a Card," the entire contents of which are hereby incorporated herein by this reference.

In addition to carrying a user's validation information, the credentials 112 may be used as message carriers to carry message objects to the message hosts (i.e., readers 108). Exemplary credentials 112 may include, without limitation, Radio Frequency (RF) proximity cards, RF smart cards, magstripe cards, optically based access credentials, biometric authentication credentials, key fobs, CD-ROMS, flash drives, and any other portable medium capable of storing a message object and communicating the message object to a message host. In accordance with at least some embodiments of the present invention, at least some of the message hosts (i.e., readers 108) in the premises are non-networked, meaning that they have no direct mechanism of communication with any other message host. Instead, such non-networked message hosts rely on the message carriers to receive a message object and share message objects with other non-networked message hosts.

Figure 2:
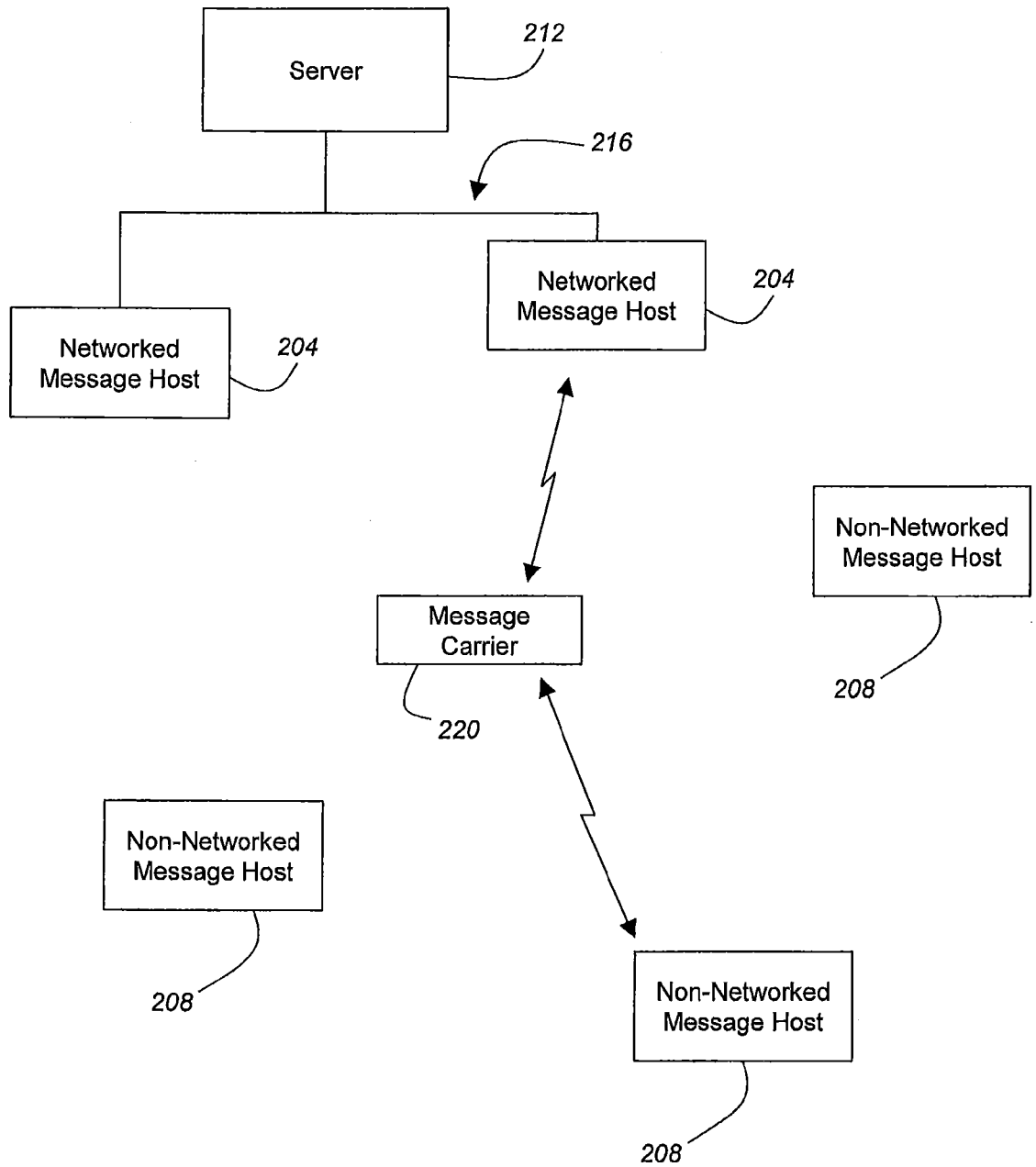
FIG. 2 depicts an access control system in accordance with embodiments of the present invention.

FIG. 2 depicts further details of a secure access system 200 in accordance with at least some embodiments of the present invention. The secure access system 200 generally includes a population of message hosts, typically in the form of access control readers. The population of message hosts may be divided into two types, namely networked message hosts 204 and non-networked message hosts 208. Networked message hosts 204 comprise the ability to directly communicate with at least one other access control device, such as another networked message host 204 or a server 212. The direct connection between the networked message hosts 204 and the other access control devices may be facilitated by a network connection 216. The network connection 216 may be in the form of a wired and/or wireless communication link.

Due to their direct connectivity to other access control devices, the networked message hosts 204 may share message objects with one another without requiring an intermediary message carrier 220. The server 212 may comprise a permissions server or some other type of centralized control panel that distributes message objects, such as access control policy information, to other networked message hosts 204. In accordance with at least one embodiment of the present invention, the networked message hosts 204 may be used as access control devices that originate message objects throughout the secure access system 200. The networked message hosts 204 may originally receive message objects from the server 212 via the network connection 216. Then, when a message carrier 220, such as a credential 112, comes within communication range of the networked message host 204, the networked message host 204 may communicate the message object to the message carrier 220. The message carrier 220 may then store the message object and convey the message object to any other message host that it communicates with. In this way, the message carrier 220 can be used to carry a message object from a networked message host 204 to a non-networked message host 208.

In accordance with at least one embodiment of the present invention, the message carrier 220 comprises an RF enabled credential and the message hosts 204, 208 comprise RF enabled readers. When the message carrier 220 is brought within a predefined communication range of the message host 204, 208, an RF dialog may be established between the message host 204, 208 and message carrier 220. During this communication dialog, the message host 204, 208 may communicate any type of active or most current message objects to the message carrier 220. The message carrier 220 may, in a likewise fashion, communicate any type of active or most current message objects is has stored on its memory to the message host 204, 208. This allows the message carrier 220 to supply new message objects to the message host 204, 208 and receive new message objects from the message host 204, 208. The message carrier 220 can, therefore, be used as a mechanism for the non-networked message hosts 208 to share any message objects they have with other devices in the secure access system 200.

In accordance with at least some embodiments of the present invention, message carriers 220 may only be allowed to send and/or receive message objects to/from message hosts 204, 208 after the message carrier 220 has been authenticated by the message host 204, 208 and the message host 204, 208 has determined that the message carrier 220 currently has permission to access the access point 104 or asset 106 associated with the message host 204, 208. This is particularly useful to help deter the transmission of bad or otherwise unauthorized message objects throughout the secure access system 200. The message hosts 204, 208 may restrict accepting a message object from a message carrier 220 until it has authenticated the message carrier and determined that its access permissions are valid. Additionally, the message hosts 204, 208 may refrain from sending a message object to message carriers 220 until there has been a proper authentication and validation of the message carrier 220.

Figure 3:
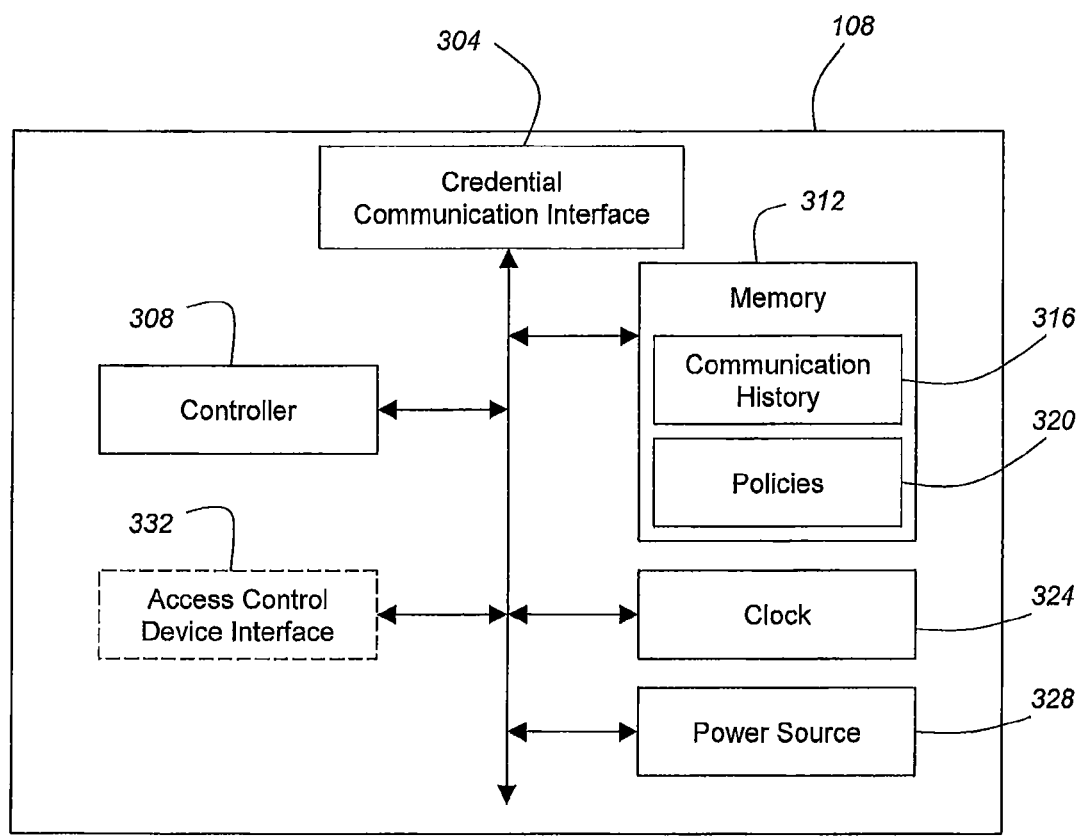
FIG. 3 depicts components of a reader in accordance with embodiments of the present invention.

Referring now to FIG. 3, details of a reader 108 or similar type of message host 204, 208 will be described in accordance with at least some embodiments of the present invention. The reader 108 generally comprises the capability to automatically read data, typically in the form of a message object and/or validation information, from a credential 112. The reader 108 may also be capable of writing data, typically in the form of a message object, back to the credential 112.

The reader 108, in accordance with at least one embodiment, comprises a credential communication interface 304 used to communicate back and forth with the credential 112. The credential communication interface 304 may comprise an RF communication interface (e.g., an RF antenna), a magnetic communication interface (e.g., a magnetic stripe reader), an optical communication interface (e.g., an infrared detector and transmitter), an electrical contact communication interface, or any other means of communicating information to/from a credential 112.

Connected to the communication interface 304 is a controller 308. In one embodiment, the controller 308 includes a microprocessor, a random number generator, and a cryptographic coprocessor. The controller 308 is capable of properly modulating/demodulating data sent to and received from external devices such as the credential 112. The controller 308 controls and determines how the reader 108 behaves when a credential 112 is presented to it. The controller 308 may include any general-purpose programmable processor, digital signal processor (DSP) or controller for executing application programming. Alternatively, the controller 308 may comprise a specially configured Application Specific Integrated Circuit (ASIC).

The controller 308 may also be provided with control circuitry capable of manipulating an access control device. The access control device is designed to secure the point of access 104 or asset 106 being protected by the reader 108. The controller 308 is enabled to communicate with the access control device via the access control device interface 332. Examples of a typical access control device include, without limitation, an electronic lock, a magnetic lock, or an electric strike for a door, a lock for a computer system, a lock for a database, a lock on a financial account, or a lock on a computer application. In one embodiment, the controller 308 actuates the access control device by sending a signal to the access control device via the access control device interface 332 based on results of an access decision made by the controller 308. Optionally, the access control device may be integral to the reader 108 in one embodiment, in which case an access control device interface 332 would not be necessary. In an alternative embodiment, an access control device is external to the reader 108, thus necessitating the interface 332. Examples of an access control device interface 332 include any type of data port such as a USB port, serial data port, parallel data port, a convention wire, a wireless communication port such as a Bluetooth data interface, or any other type of wired or wireless communication interface.

In addition to an access control device interface 332, the reader 108 may further comprise a memory 312. The memory 312 may be used to store application data, the host unique ID, a communications history log 316, a set of access policies 320 or other types of message objects, and any other functions that can be executed by the controller 308. The memory 312 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 312 and the controller 308 are designed to utilize known security features to prevent unauthorized access to the contents of the memory 312 such as side channel analysis and the like.

The communication history log 316 may provide a location in memory where a register of all communications for the reader 108 is stored. The communication history log 316 may be used in connection with determining what credentials 112 are typically presented to a particular reader 108 as well as when and with what frequency such credentials 112 are presented to the reader 108. Thus, the communication history log 316 may serve as a mechanism to model the information flow in a particular secure access system 200.

The reader 108 may further comprise a clock 324. The clock 324 is depicted as internal to the reader 108, but the clock may also be external to the reader 108. The clock 324 tracks the current time. The controller 308 may be adapted to read the time from the clock 324 and provide that time to a credential 112, for the credential's communication history log. The clock 324 may further be employed to determine if the holder of a particular credential 112 is currently allowed access to an asset protected by the access control device 312. The controller 308 may also reference the policies 320 in memory 312 to determine if a credential 112 is allowed access to an associated access point 104 or asset 106 based on the current time as determined by the clock 324. The controller 308 may also reference the clock 324 to determine when a particular policy 320 should be implemented, in the event that one or more policies 320 is set to have a delayed start and comprises a timer mechanism.

A power source 328 may also be included in the reader 108 to provide power to the various devices contained within the reader 108. The power source 328 may comprise internal batteries and/or an AC-DC converter such as a switch mode power supply or voltage regulator connected to an external AC power source.

Although not depicted, a reader 108 may further include a communication interface that provides communication capabilities between the reader 108 and external servers or other network nodes. Such a communication interface may include a USB port, a modem, a network adapter such as an Ethernet card, or any other communication adapter known in the art. These types of communication interfaces are typically only included in networked message hosts 204.

Figure 4:
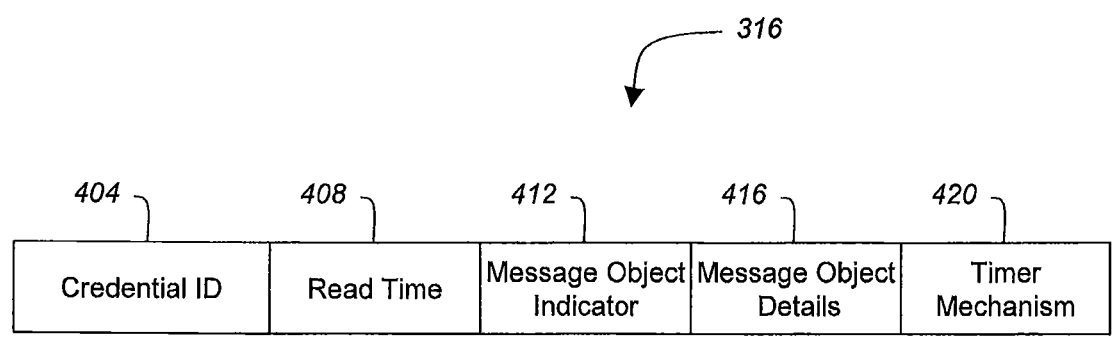
FIG. 4 depicts a data structure used to organize communication histories and policy information in accordance with embodiments of the present invention.

Referring now to FIG. 4, additional details of the communication history log 316 will be described in accordance with at least some embodiments of the present invention. The communication history log 316 may comprise a number of different data fields, such as, a credential ID field 404, a read time field 408, a message object indicator field 412, a message object details filed 416, and a timer mechanism field 420. The communication history log 316 may be used to store communications history for an associated reader 108. The communications history 316 may be refreshed on a periodic (e.g., daily, weekly, monthly, yearly) basis. Alternatively, the communications history 316 may be maintained for the life of the reader 108, in which case additional memory capacity may need to be added to the reader 108 during the course of its life.

The credential ID field 404 may comprise identification information for each credential 112 presented to the reader 108. The information in the credential ID field 404 may include a unique card number assigned to the credential 112, a user's name associated with the credential 112, or some other information that uniquely identifies the credential 112. Non-unique information may also be maintained in the credential ID field 404 such as site codes or other information that identifies a group to which the credential 112 belongs.

The read time field 408 may comprise information relating to the time when a particular credential 112 communicated with the reader 108. The value in the read time field 408 may be obtained by referencing the clock 324. The read time may be maintained to any type of granularity (e.g., months, weeks, days, hours, seconds, etc.), depending upon the required accuracy of read time. If no accurate read time is required, then the read time field 408 may simply provide an indication of the sequence in which a particular credential 112 was read relative to another credential 112.

The message object indicator field 412 may contain information showing whether a particular credential 112 sent a policy or similar type of message object to the reader 108 and/or whether the reader sent a policy or similar type of message object to the credential 112. The message object indicator field 412 may also provide identification information for certain message objects. More specifically, message objects may be circulated throughout the secure access system 200 with a particular name or identifier. When the message object is received by a new access control device, the message object identifier may be maintained in the message object indicator field 412 so that a reader 108 has a quick reference record of the message objects which it has received. Additionally, message object indicators may be provided for message objects which are transmitted to credentials 112. This allows a system administrator to determine which credentials 112 have a particular message object stored thereon, without actually checking the credential 112 itself.

The message object details field 416 may contain details about the policy or message object which was transmitted to/from the reader 108. In accordance with at least one embodiment of the present invention, when a message object corresponds to a new access control policy, the message object details field 416 incorporates a definition of the access control update. Such access control updates generally include a change in access rights for at least one credential 112 to access at least one point of access 104 or asset 106 associated with reader 108. For example, if access permissions for a particular credential 112 have been revoked (e.g., because a user associated with the credential 112 no longer works for a company maintaining the premises 100), then the message object details field 416 may incorporate instructions telling all readers 108 to stop allowing the identified credential 112 access to associated access points 104 and/or assets 106. Thus, information maintained in the message object details field 416 (and message objects in general) typically includes an identification of at least one credential 112 and an access rule for that at least one credential 112. Alternatively, the message object may correspond to an application update for one or more applications stored on the reader 108, in which case the message object details field 416 may comprise the updated application as well as instructions for the reader 108 to install the new application. Another type of message object used in accordance with at least some embodiments of the present invention may include a reader enable update. In this particular embodiment, the readers 108 may be adapted to stop allowing access to any credential 112 after a predetermined amount of time unless the reader receives a new message object renewing the reader's 108 activity subscription.

The message object, in addition to providing instructions for the reader 108 (or credential 112 in some applications) may also include a timer mechanism 420. The timer mechanism 420 may define a life span for a particular message object. The information in the timer mechanism field 420 may include details related to the life span of the message object. More specifically, the timer mechanism 420 associated with a particular message object may cause the message object to become active only after a predetermined time. In other words, a delayed policy update may be implemented with message objects having timer mechanism 420 that define a certain time after the message object was first distributed before the message object becomes active (i.e., the timer mechanism may define a predetermined time in which a reader 108 should begin implementing the instructions contained within the message object). The timer mechanism 420 may also define how long a particular message object is to remain active. This particular implementation may utilize the timer mechanism to deactivate the message object after a predetermined amount of time, unless a new message object is received extending the timer mechanism. Accordingly, information in the timer mechanism field 420 may be used to define the beginning and end of an associated message object's lifetime. In accordance with at least some embodiments of the present invention, the timer mechanism may be appended to a message object at the beginning/end of the message object details or in a header of the message object. A flag may also be included in communications that contain a message object if the message object contains a timer mechanism 420. Such a flag will allow the receiving access control device to search the message object for the relevant timer mechanism.

Figure 5:
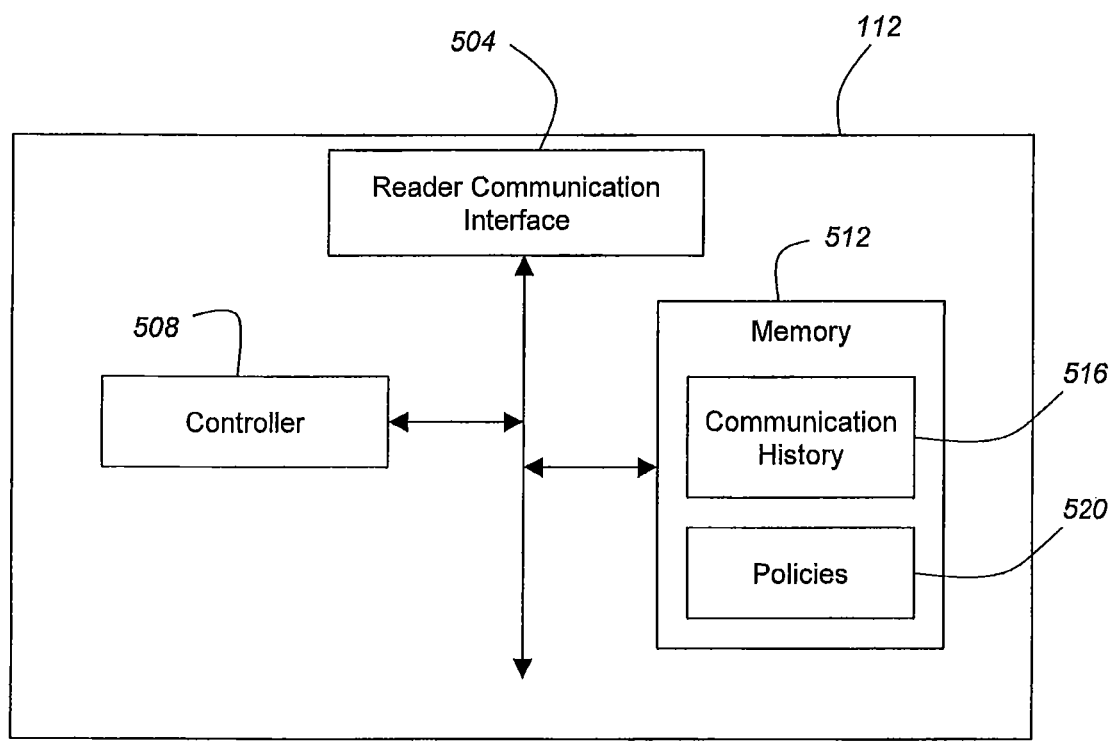
FIG. 5 depicts components of a credential in accordance with embodiments of the present invention.

FIG. 5 depicts an exemplary credential 112 which will now be described in accordance with at least some embodiments of the present invention. The credential 112 may include a communication interface 504 that allows the credential 112 to communicate with external devices such as the reader 108. The communication interface 504 may comprise an RF antenna that allows the credential 112 to receive and transmit data without contact. In other embodiments a magnetic, optical, or electrical contact communication interface 504 may be utilized.

A controller 508 may be connected to the communication interface 504. The controller 504, in one embodiment, includes a microprocessor, a random number generator, and a cryptographic coprocessor. The controller 508 may include any general-purpose programmable processor, digital signal processor (DSP) or controller for executing application programming. Alternatively, the controller 508 may comprise a specially configured application specific integrated circuit (ASIC). Similar to the controller 308 on the reader 108, the controller 508 includes known security features that substantially prevent unauthorized access to the contents of memory 512.

The memory 512 typically comprises non-volatile memory, such as flash memory. Non-volatile memory is generally used because the credential 112 is preferably a passive credential meaning that it does not have an internal source of power. Rather, the credential 112 uses energy from an RF field created by the reader 108 to power its components. Contents of the memory 512 may include a communication history log 516, policies 520 and other message objects, and any other applications to be executed by the credential 112. The communication history log 516 is similar to the communication history log 316 stored on the reader 108 except the credential ID field 404 is replaced with a reader ID field, where the reader ID field identifies reader with which the credential 112 has communicated with. More particularly, the reader ID field identifies readers 108 to which the credential 112 has transmitted message objects and readers 108 from which the credential 112 has received message objects.

In an alternative embodiment the credential 112 may be provided with an onboard power supply. Such credentials 112 are known as active credentials 112. An active credential 112 can keep its own trusted time that can be synchronized with the network devices during interactions with readers 108, for example. This way the credential 112 can also control when certain message objects having a timer mechanism 420 should be activated and/or deactivated based on a reference to the internal clock.

Figure 6:
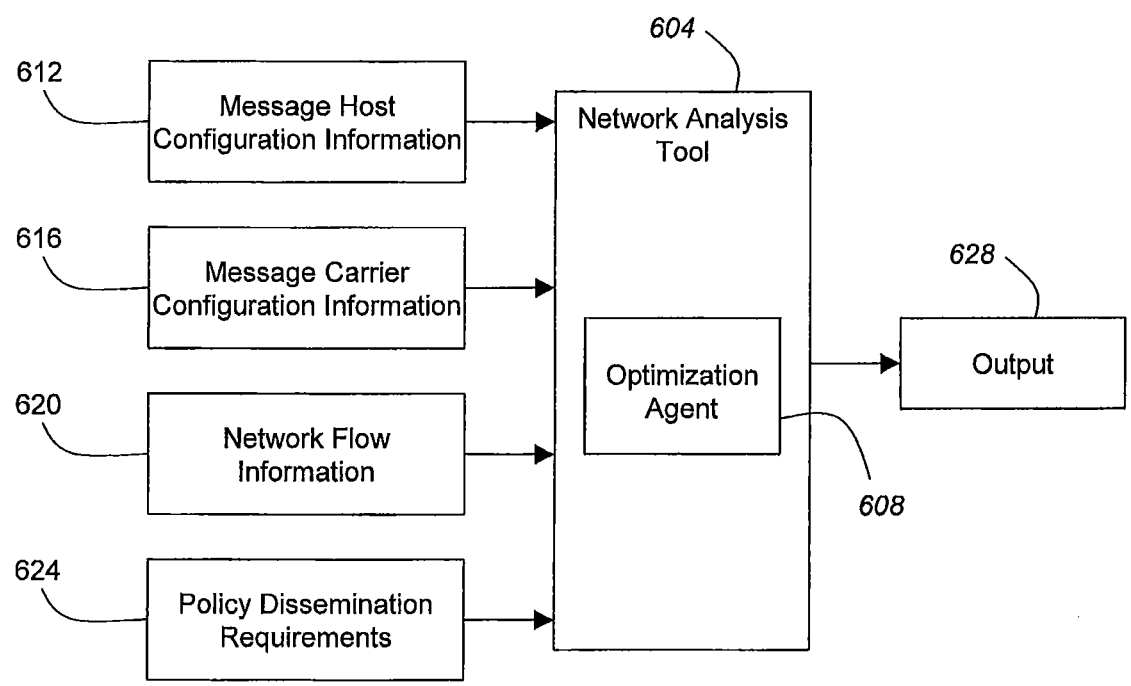
FIG. 6 depicts a network analysis tool used to optimize information dissemination in the access control system in accordance with embodiments of the present invention.

With reference now to FIG. 6, a network analysis tool 604 will be described in accordance with at least some embodiments of the present invention. The network analysis tool 604 may reside on and be executed by a processing platform such as a server, computer, laptop, etc. The network analysis tool 604 may be used to analyze the both simulated secure access systems 200 and actual secure access systems 200. More specifically, the network analysis tool 604 may employ an optimization agent 608 to optimize the efficiency with which information (e.g., a message object) is disseminated through an access control system having at least one non-networked message host 208. In accordance with at least some embodiments of the present invention, the optimization agent 608 may be adapted to analyze a proposed configuration of access control devices (e.g., location and network capabilities of message hosts 204, 208 and number of credentials 112) and then suggest changes to the proposed configuration that would optimize the dissemination of message objects through the secure access system 200. The optimization agent 608 may also be adapted to analyze actual configurations of access control devices and then either provide statistics related to the flow of message objects in the secure access system 200 or provide suggestions for optimizing the dissemination of message objects through the secure access system 200.

The inputs to the network analysis tool 604 may include, for example, message host configuration information 612, message carrier configuration information 616, network flow information 620, and policy dissemination requirements 624. The message host configuration information 612 may include the number and location of message hosts 204, 208 in the secure access system 200 as well as each message hosts' network capabilities. More specifically, the message host configuration information 612 may indicate whether a particular message host is a networked message host 204 or non-networked message host 208, and if it is a networked message host 204 what other access control devices the networked message host 208 is capable of communicating with directly. The message host configuration information may be provided as actual data representing an actual layout of message hosts 204, 208 or as simulation data representing a proposed layout of message hosts 204, 208.

The message carrier information 616 may include the number and type of message carriers 220 in the secure access system 200. Additionally, the message carrier information 616 may define the access permissions of certain credentials 112. This information may be worth noting in embodiments where credentials 112 are limited to sending and receiving message objects with message hosts 204, 208 only when they are authorized to access assets 106 or access points 104 associated with the message hosts 204, 208. It is in these particular embodiments where such information will affect the dissemination of a message object through the secure access system 200.

In a simulated secure access system 200, the network flow information 620 may be estimated based on typical information flow conditions. More specifically, the network flow information 620 may be based on the actual network flow information of other secure access systems 200 having a similar configuration to the secure access system 200 being simulated. In an analysis of an actual secure access system 200, however, the network flow information 620 may either be simulated or determined based on historical network flows of the system 200. More specifically, the network flow information 620 may be determined by referencing the communication history 316, 516 of the access control devices to determine what message carriers 220 traditionally communicate with what message hosts 204, 208. The level of detail of this information 620 may be based upon the level of detail of information maintained in the communication history logs 316, 516. For example, if read time is stored to the second, then the same granularity of information may be incorporated into the network flow information 620.

The policy dissemination requirements 624 may be user defined. These requirements may be provided in a number of different ways (e.g., either as restrictions or as goals). The policy dissemination requirements 624 specify how quickly message objects should be shared throughout a particular secure access system 200. The policy dissemination requirements 624 may be defined in terms of a required number of access control devices (e.g., a percentage of message hosts 204, 208 and/or message carriers 220) that need to receive a particular message object within a certain time or the amount of time in which a certain number of access control devices need to receive a particular message object.

The network analysis tool 604 may receive all of the above-described input information and employ the optimization agent 608 to determine various ways in which message objects can be distributed through the secure access system 200 more efficiently. In accordance with at least some embodiments of the present invention, one measure of system performance as determined by the optimization agent 608 is the degree of separation between a message originating host 204, 208 and other message hosts 204, 208 or message carriers 220 in the system 200. The degree of separation counts the minimum number of message conveying steps expected for the message object to reach a selected message host 204, 208 or message carrier 220 in a two-colony system (e.g., a secure access system 200 comprising networked and non-networked message hosts 204, 208).

Figure 10:
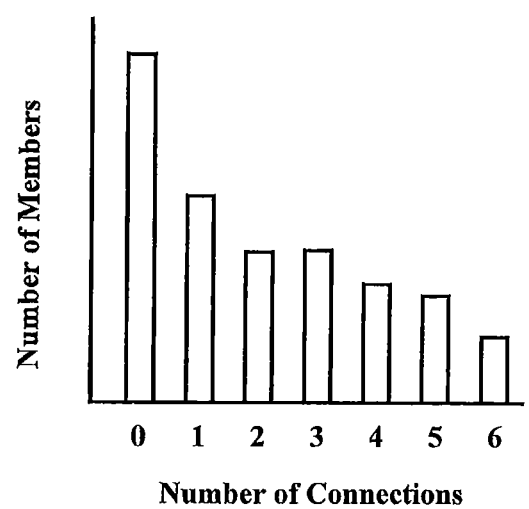
FIG. 10 is a chart illustrating a degree distribution of connections with members in accordance with embodiments of the present invention.

In accordance with at least some embodiments of the present invention, the standard definition for connectedness, k, of a network does not satisfy the requirements of a two-colony system. The connectedness, $k_c$, of a message carrier can be alternatively defined as the number of unique message hosts 204, 208 that were visited by that message carrier 220 at least once during a given time period. Similarly each message host 204, 208 has a value, $k_h$, representing the number of unique message carriers 220 that it shared a transaction with during the same time period. Histograms of k for message carriers and message hosts can be used to categorize the type of network, an example of which is depicted in FIG. 10.

Most networks, in general, fit into one of three degree distribution classifications: Scale Free Networks have fat-tails, indicating more long range connections, and are characterized by a power law; Geometric Networks can be hierarchical and have an exponential distribution in k; Random Networks are more localized and follow a Poisson distribution.

An alternative to matching a distribution to the degree distribution is to perform spectral analysis to the message host-to-message host adjacency matrix $W_{hh}$ or message carrier-to-message carrier matrix $W_{cc}$ found by squaring the message carrier-to-message host adjacency matrix $W_{ch}$. Spectrum of random networks will follow the Wigner Semicircle, while scale free networks will have a triangular shape. Structured networks, such as hierarchical networks, will have more complex spectra.

Experimental and Modeled Value of k

Modeling degree distribution requires two pieces of information, one is the sum of all connections, $\Sigma k$, and the other is the shape of the distribution. For purposes of this illustration, the k-distribution is assumed to be exponential.

Measured values of $\Sigma k$ indicate that the total number of connections can be modeled based on the number of message carriers, $n_c$, and the number of doors, $n_r$.

Sparseness of Message Carrier—Message Host Adjacency Matrix ($A_{ch}$)

The total sum of connections in the system 200 can be used to calculate the sparseness of the adjacency matrix. The connected fraction can be found by dividing the number of expected connections by the number of possible connections. Then the fraction of zeros, ZF, is found by subtracting the connected fraction from one.

$$ZeroFraction = 1 - \frac{\sum k}{n_r \cdot n_c}$$

Modeling the Message Carrier-Message Host Adjacency Matrix ($A_{ch}$)

When the degree distribution is well known (e.g., in an actual secure access system 200), a general approach can be used to find an appropriate generating function for the adjacency matrix. If the degrees are assumed to follow an exponential k-distribution profile and matching constraints for the modeled value of k for both the message carrier and message host populations, then the adjacency matrix is filled by assigning random elements in $A_{ch}$ a connection value of 1 based on the probability P(C, H), where C and H are message carriers and message hosts, respectively. This process is repeated until all $\Sigma k$ connections have been assigned.

Weighted Adjacency Matrix ($W_{ch}$)

The adjacency matrix, A, is then modified to become a weighted adjacency matrix, W, by replacing the connections in A with the event probability. The probability can be found experimentally by sampling the events from operational access control sites over a specified period of time. In the adjacency matrix, a value of one indicates that a transient connection existed at least once during the measurement period, and the weighted matrix specifies the strength of that connection. A zero in the adjacency matrix indicates a zero probability for the specified connection in the weighted matrix.

Plotting the number of events in each non-zero element in experimental data shows a power law distribution for the connection frequency probability mass function.

The probability mass function of connection strengths may follow a power-law distribution for waiting time, particularly the generalized Zipf function known as the Zipf-Mandelbrot law:

$$P_w(k; N, q, s) = \frac{\frac{1}{(k+q)^s}}{\sum_{i=1}^{N} \frac{1}{(i+q)^s}}$$

One benefit of using this function in the analysis agent is the cutoff of the fat-tail typical in power law distributions by the normalization constraint, k<N. The experimental value for s in the equation is very close to 2 for some systems. The analysis agent can utilize this definition of $P_w$ by setting s=2 and defining a relationship for q based on population inputs.

Each element in $A_{ch}$ is assigned a connection strength drawn from this distribution to create the weighted adjacency matrix, $W_{ch}$. After assigning weights to $W_{ch}$ the matrix, is normalized to make the sum of probabilities equal to one.

A bias may be utilized by the analysis agent to represent the phenomena seen in actual systems 200 to produce a probability distribution that has a higher likely connection strength in the weighted adjacency matrix $W_{cr}$ for vertexes that are connecting high k colony members. The analysis agent may also modify the connection strength based on time.

Markov Chain Monte Carlo

The weighted adjacency matrix is used along with a pair of state vectors for each update issued to the system. The two state vectors respectively record which message carriers and which message hosts have received the update via a message object. At each step of a Markov Chain Monte Carlo (MCMC) a connection is randomly drawn from the weighted adjacency matrix. The states of the selected members are checked and if one and only one of the components has the update, then the update is propagated to the other member. If both or neither members has an update, then the result is null. Here interest lies in following the state vector, F, with each step rather than finding an equilibrium state (which can be assumed to be a vector of fully updated components).

The propagation of information in the message carrier population, $\Gamma_c$, depends on both the number of message hosts that have the information, $\Lambda_r$, and the number of message carriers without the knowledge of the message object available to receive a message object. Similarly the velocity of information in the message host population depends on both the number of message carriers and message hosts with the message.

$$\Gamma_c = f_c(\Lambda_c, \Lambda_h) \Gamma_h = f_h(\Lambda_c, \Lambda_h)$$

Velocity, $\Gamma$, is the time (or event) derivative of the position (or number), $\Lambda$. This leads to two coupled partial differential equations in $\Lambda$, e.g. if $\Lambda$ is a function of time:

$$\frac{\delta \Lambda_c}{\delta t} = f_c(\Lambda_c, \Lambda_h) \text{ and } \frac{\delta \Lambda_h}{\delta t} = f_h(\Lambda_c, \Lambda_h)$$

This codependence of information flow results in a self-limiting system where neither the message carrier population nor message host population will tend to get far ahead of the other. While this is a general rule, there are conditions where one velocity can initially be faster than the other.

In the equations above the velocity can be measured as either the propagation of the update per event, $\Lambda(e)$ or per time, $\Lambda(t)$. The natural unit used by the analysis agent in its calculations is based on events. A relationship between event units and time units can be used to convert the results to units of time.

Model Results

Figure 11:
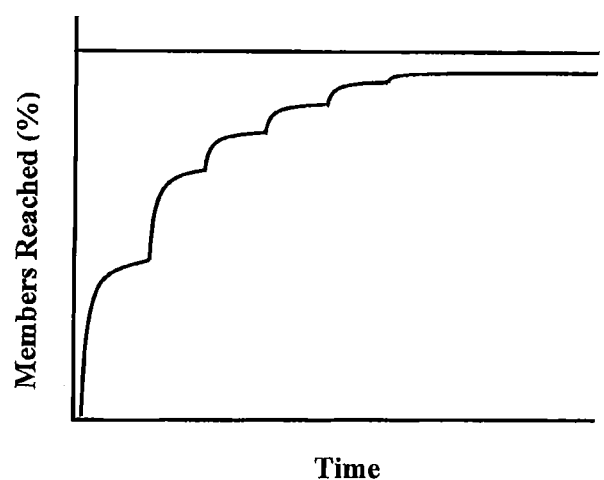
FIG. 11 is a chart illustrating message propagation through the access control system as a function of time in accordance with embodiments of the present invention.

Performance of message delivery in an operational two colony system can be studied (e.g., by the network analysis tool 604) by constructing the weighted adjacency matrix, $W_{cr}$, based on data from a one colony system with the conveyance of a message object being inferred when a message carrier 220 visits a first message host 204, 208 and then a second message host 204, 208. The weighted adjacency matrix is used to propagate information in a Markov process. The simplest model has just two input values, the number of message carriers, $n_c$, and the number of message hosts, $n_r$. A message is initialized on one or more colony members and allowed to flow through the system. Exemplary model results (e.g., output 628) obtained by the network analysis tool 604 are depicted in FIG. 11.

Generally depicted on the graph is the population of either the message carriers, $\Lambda_c$, or the message hosts, $\Lambda_h$, modeled from actual site data (e.g., communication history logs 316, 516), that have received or were initialized with a message object. In accordance with at least one embodiment of the present invention, the line is the average of multiple MCMC trials.

Model Improvements

In accordance with at least some embodiments of the present invention, the optimization agent 608 may be operable to generate a number of different outputs 628 depending upon whether it is analyzing a proposed layout of a secure access system 200 or an actual layout of a secure access system 200. Examples of the types of outputs 628 which may be generated by the optimization agent 608 will be discussed in further detail below.

Loop Events

Loop events are identified as diagonal components in the host-to-host adjacency matrix, $W_{hh}$, where $W_{hh}$ is a square matrix resulting from multiplying the weighted adjacency matrix by its transpose. These events affect the system performance by taking away from the number of possibly productive event, essentially acting to lower the effective number of events in a given time period. The optimization agent 608 may suggest configuration changes to reduce the number of loop events.

Time Dependent Adjacency Matrix ($W_{cr}$)

As mentioned earlier, connection strengths in the weighted adjacency matrix change over time. Connection strengths may have a diurnal cycle caused by variations in activity levels during the day. The connection strengths may also have weekly components due to lower activity on weekends and may also have annual cycles due to holidays, etc. Connection strengths can also change relative to each other due to periodically changing traffic patterns. In a two-colony system containing message objects transported by message carriers 220 that are constrained to pass particular message hosts 204, 208 there will be a beneficial effect to the efficiency of the system. Accordingly, the optimization agent 608 may provide as an output 628 suggestions to enhance connection strengths, for example by suggesting additional constraint points be included in the secure access system 200.

Free Ride Events

In a system that constrains message carriers 220 thereby requiring them to visit specific message hosts 204, 208, it may increase the possibility that one or more second message carriers 220 will "piggy back" or "tailgate" past a message host 204, 208 by bypassing the message host when a contemporaneous first message carrier communicates with the message host and fulfills the communication requirements. When tailgating occurs it is possible for message carriers 220 to bypass message hosts 204, 208 without delivering or receiving a message object. There will also be more opportunities for tailgating when the message carrier 220 population is large compared to the message host 204, 208 population so that the average $k_r$ is high. Thus, the optimization agent 608 may suggest ways in which tailgating may be reduced, for example by increasing the number of message hosts 204, 208 in the system 200 or by suggesting additional security measures which can be taken to reduce tailgating.

Security Entropy

An important measure of a two-colony message system is its ability to maintain an environment that is current with respect to message object updates. These systems have a level of uncertainty in the currentness of information for all members in the system. The term "security entropy" is used herein to describe the chance than a message update (i.e., a message object) is available but not delivered in time due to the uncertainty in the system. A failure can be defined as an event between a message carrier 220 and a message host 204, 208 that occurs before the update has propagated to either member. The chance that an update will fail is the product of the chance of an event and the chance that neither member has received updated message object. The value determined by this calculation may be provided by the analysis tool in the output 628 to either help design a communication system 200 configuration or to make improvements to an operational communication system 200 configuration.

Improving System Performance

In addition to providing, as an output 628, statistics related to the flow of information in the secure access system 200, the network analysis tool 604 may employ the optimization agent 608 to determine if there are any ways to more quickly disseminate a message object throughout the secure access system 200. Such determinations made by the optimization agent 608 may be provided as suggestions to a user in the form of an output 628. Examples of such suggestions will be described in further detail below.

Select Individuals for Initial Update

The invention described in this analysis so far is generally based on the distribution of message objects in a two colony system where there the message object update is initiated with a single member and then allowed to spread throughout the system 200. When an update is initiated through a single individual in the system (e.g., a single originating access control device), the unique characteristics of the chosen individual can have a significant impact on the system performance. It is not always possible to choose the initiation point, but in systems that provide the choice an individual in the system can be chosen to optimize cost, convenience, and performance. Typically, a high k-value is beneficial in spreading information, but it is also important to note that initializing message carriers 220 can spread information faster in the message host 204, 208 population and vice versa. Another important consideration is taking advantage of the constraints that cause message carriers 220 to visit particular message hosts 204, 208, which has the dual benefit of producing a component with a high k-value with the additional benefit of a high connection strength with the message hosts 204, 208. Furthermore, in systems with a strong diurnal cycle, the benefit from such constriction points can be most pronounced at the beginning of the day, making the system 200 efficient at distributing message objects early in the update cycle. All of these factors may be considered when the optimization agent 608 suggests an originating secure access device, which can correspond to either a message carrier 220 or message host 204, 208.

More Connected Components

Having more colony members initialized with the message object update has a direct impact on the update probability, $P_{nu}(t)$. This improvement gives both a better starting position and a better initial rate for the update to propagate making it a useful tool for controlling performance. Accordingly, the optimization agent 608 may suggest that one or more previously non-networked message hosts 208 have their communication capabilities altered to make them become a networked message host 204. The optimization agent 608 may also suggest which access control device the message host should be connected to.

Pre-Launched Updates

When message objects can be released into a system in advance of their eventual need then a pre-launch of the updates with a delayed "activation" will greatly improve the apparent performance of the message delivery system. The delayed activation may be facilitated by incorporating a timer mechanism 420 into the message object such that the message object is activated as some point in time after it is initially distributed into the system 200.

Forced Updates

One of the problematic issues for message object delivery in a two colony network is the concern that an individual in one or both colonies is missed altogether in the updating process. While a well maintained system 200 may keep components updated on average, some components can miss updates for long periods of time. To address this concern a forced update can be required by the system. Forced updates can be implemented either on a regular scheduled or required after a period of inactivity. Again, the timer mechanism 420 may be utilized to have a particular message host 204, 208 or message carrier 220 become inactive after a predetermined amount of time unless it receives a new message object. This will force users of the message carriers 220 to go and obtain a new message object on a periodic basis.

A combination of Pre-Launch Updates and Forced Updates can be used to produce a zero entropy delayed-update.

Figure 7:
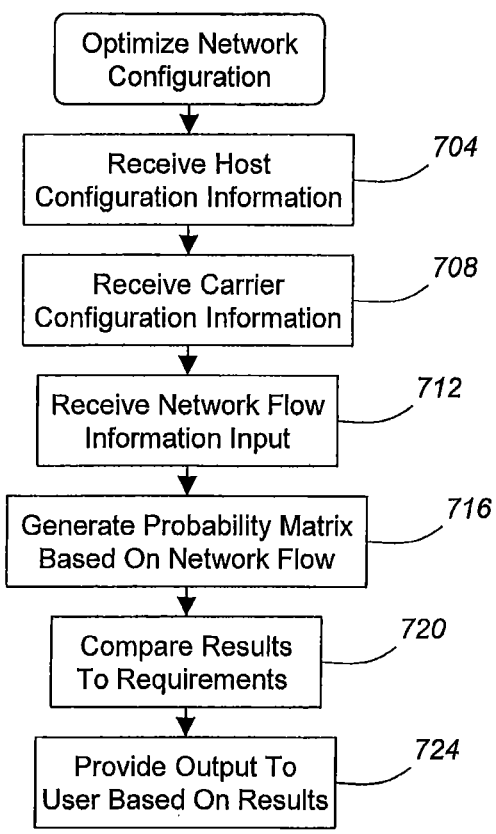
FIG. 7 is a flow chart depicting a method of optimizing a network configuration with respect to information dissemination in accordance with embodiments of the present invention.

Referring now to FIG. 7, a method of optimizing the configuration of a secure access system 200, particularly in a simulation environment, will be described in accordance with at least some embodiments of the present invention. The method is initiated when the network analysis tool 604 receives message host configuration information 612 (step 704). The message host information 612 may include information related to the number, location, and type (e.g., networked or non-networked capabilities) of each message host 204, 208 in a secure access system 200.

The network analysis tool 604 then receives the message carrier configuration information 616 (step 708). This information may include the number and types of message carriers 220 in the secure access system 200 as well as the access permissions associated with each message carrier 220.

Thereafter, the network analysis tool 604 receives the network flow information 620, which defines potential ways in which message carriers 220 will travel through the secure access system 200 (step 712). More specifically, the network flow information 620 may be based on data received from communication logs of other access control devices in similar secure access systems. In a simulation, the flow information 620 may also include predicted times when certain message carriers 220 will communicate with certain message hosts 204, 208.

Once the network analysis tool 604 has received the necessary inputs to simulate the activity of the secure access system 200, the network analysis tool 604 proceeds by generating a probability matrix based on the network flow (step 716). The probability matrix may include probabilities related to whether certain access control devices (e.g., message hosts 204, 208 and/or message carriers 220) will receive a message object within a predetermined time after the message object is introduced into the secure access system. Additionally, the probability matrix may also provide information showing the number of access control devices that will receive a message object within a predetermined time to within a predetermined probability.

A Markov process may generate the probability matrix as described above. The resulting probability matrix may then be compared to information (e.g., in the form of a message object carrying new access control policy information) flow requirements for the secure access system (step 720). The results of that comparison may then be provided as output 628 to a user of the network analysis tool 604 (step 724). More specifically, if the probabilities in the matrix meet or exceed the information flow requirements, then the network analysis tool 604 may indicate that the proposed configuration meets the requirements. Alternatively, if the information flow requirements are greatly exceeded, the network analysis tool 604 may suggest ways to decrease the cost of implementing the proposed secure access system 200. For example, the network analysis tool 604 may indicate on the user interface which networked hosts 204 may be changed to a non-networked host 208 while still meeting the information flow requirements. This indication may be made by coloring the identified message host in a different color or shading it in a different manner from the other message hosts 204, 208. Alternatively, if the information flow requirements are not met, then the network analysis tool 604 may identify certain message hosts 204, 208 that should either be relocated or have their communication capabilities changed. These identified message hosts 204, 208 may also be highlighted on the user interface and the network analysis tool 604 may further highlight the area in the premises 100 where another message host 204, 208 should be placed.

Figure 8:
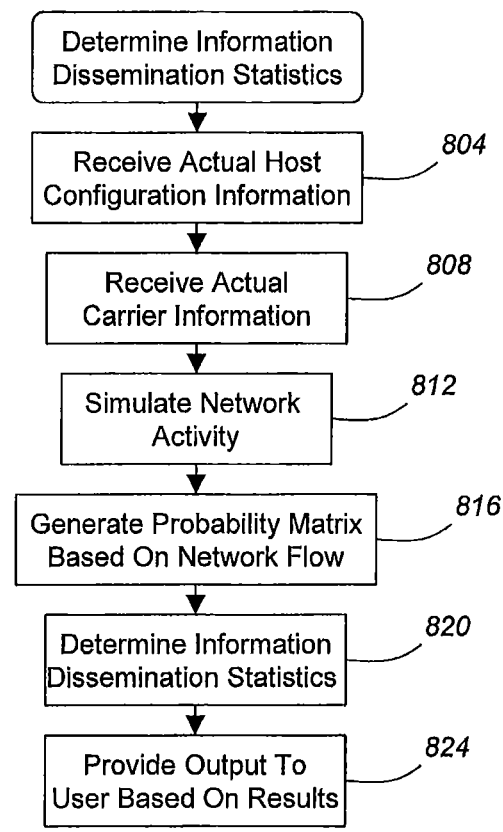
FIG. 8 is a flow chart depicting a method of determining information dissemination information in accordance with embodiments of the present invention.

With reference now to FIG. 8, a method of determining information (e.g., message object) dissemination statistics will be described in accordance with at least some embodiments of the present invention. The method begins when actual host configuration information 612 and actual carrier information 616 is received at the network analysis tool 604 (steps 804 and 808). The actual host configuration information 612 may be retrieved directly from a server or similar type of computing platform that is controlling the secure access system 200. Alternatively, the configuration information 612 may be input manually by a user of the network analysis tool 604.

Thereafter, the information flows are simulated based on information received from the communication history logs 316, 516 of the message hosts 204, 208 and carriers 220 (step 812). This simulation re-creates, within a certain degree of approximation, how a message object will be distributed throughout an actual secure access system. Moreover, the historical information can be used to project future flow statistics for the same secure access system 200.

After the information flow activity has been simulated, the network analysis tool 604 continues by generating the probability matrix showing the probability statistics for the information flow (step 816). The probability matrix may then be used to determine information dissemination statistics (step 820). The type of information dissemination statistics may include statistics related to how quickly a message object will be shared with the entire secure access system 200, how quickly a message object will be shared with a certain portion of the secure access system 200, what is the probability that a message object will be provided to a particular access control device within a predetermined time, what is the probability that a message object will not be shared with a particular access control device within a predetermined time, an indication of time needed for a message object to reach a particular access control device within a predetermined probability, and so on.

The network analysis tool 604 may then generate outputs 628 providing the determined information dissemination statistics to a user (step 824). The user may be allowed to interact with a user interface to change how the information is displayed as well as what information is displayed to the user. For example, the user may be allowed to select a particular message host on the user interface, and all of the probabilities associated with that message host (e.g., probability that it will receive a message object before a predetermined time, probability that it will not receive a message object before a predetermined time, amount of time required for it to receive a message object within a predetermined probability, number of interactions with message carriers 220 it will need before it receives the message object, etc.) as well as any other pertinent information related to the selected message host. A similar function may be performed for a selected message carrier 220 or a population of message hosts 204, 208 and/or message carriers 220.

Figure 9:
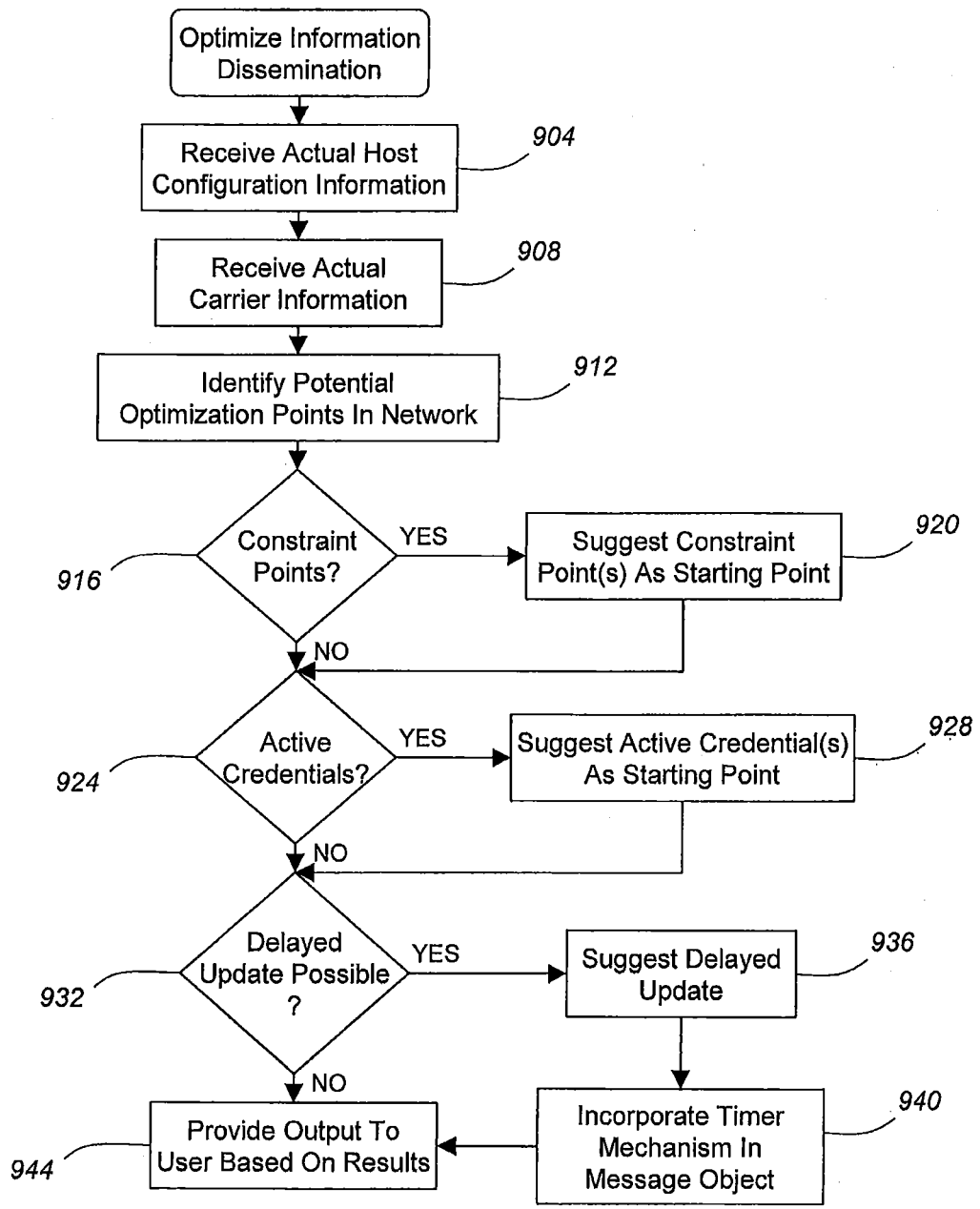
FIG. 9 is a flow chart depicting a method of optimizing information dissemination in a fixed network configuration in accordance with embodiments of the present invention.

Referring now to FIG. 9, a method of optimizing the dissemination of information (e.g., message objects) through a secure access system 200 will be described in accordance with at least some embodiments of the present invention. The method is initiated when actual host 204, 208 and carrier 220 information is received at the network analysis tool 604 (steps 904 and 908). The network analysis tool 604 may then employ the optimization agent 608 to analyze the configuration of the secure access system 200 to determine if there are any ways to enhance the efficiency with which a message object is distributed throughout the system 200 (step 912). The optimization agent 608 may analyze past simulations as well as actual distributions of message objects for the secure access system 200 or access systems having similar configurations to the secure access system 200 under scrutiny.

During its analysis of the system 200 configuration the network analysis tool 604 will utilize the optimization agent 608 to determine if there are any possible constraint points in the system 200 (step 916). Constraint points typically correspond to points in the premises 100 where a large proportion of message carriers 220 will have to pass. Typical constraint points are entry/exit doors for the building, main entrances, lobbies, restrooms, etc. If there is at least one possible constraint point identified, then the optimization agent 608 will suggest one or more of the identified constraint points as a point where a message object should be originated (step 920). More specifically, the optimization agent 608 will identify access control devices (e.g., a message host 204, 208) associated with the identified constraint point and suggest that the identified message host be used as an originating access control device. Additionally, if the message host corresponds to a non-networked message host 208, then the optimization agent 608 may also suggest that the networking capabilities of the host 208 be changed such that it becomes a networked message host 204. This would make the introduction of the message object to the system 200 easier since a system administrator would then be able to provide the message object to the host 204 remotely rather than having to carry the message object to the message host 208 on a message carrier 220.

The optimization agent 608 may also analyze the system 200 configuration to determine if there are any message carriers 220, such as credentials 112, which are typically more active than other message carriers 220 (step 924). For example, there may be certain users who have to visit a larger portion of a premises 100 than other users. As one example, often times maintenance personnel are required to visit an entire premises 100 on a daily basis whereas other types of personnel only visit certain parts of a premises regularly. The message carrier 220 associated with such active users may provide a good originating message carrier 220. These active message carriers 220 may be identified by analyzing and comparing the communication history logs 316 of the message hosts 204, 208 to search for message carriers 220 that communicated with a large number of the message hosts 204, 208.

In the event that an active message carrier 220 or a number of active message carriers 220 are identified, then the optimization agent 608 may suggest that one or more of the identified active message carriers 220 be used as an origination point for the message object (step 928). Such message carriers 220 may then be given a forced update to initiate the dissemination of the message object throughout the system 200.

The optimization agent 608 may further analyze the system 200 to determine if a delayed update would be possible, and if so, whether such an update is allowable based on preferences of the system administrator (step 932). If a delayed update is possible, then the optimization agent 608 may suggest that a delayed update be performed (step 936). To accomplish this, the optimization agent 608 may provide a suggestion that rather than having the message object be distributed in an active fashion, the message object should be distributed with a timer mechanism, which will delay the activation of the message object (step 940). The optimization agent 608 may also analyze previous information dissemination statistics for the system 200 to determine the value for the timer mechanism. More specifically, the optimization agent 608 may set the value of the timer mechanism equal to the average amount of time that is required for a message object to be shared with a predetermined percentage of the access control devices in the system. For example, the value of the timer mechanism may be set equal to 2 days if it historically takes two days for 99% of the access control devices to receive a message object.

After the various suggestions have been generated by the optimization agent 608, they are provided to the user of the system 200 (step 944). The suggested optimizations may be implemented at the discretion of the system administrator depending upon the nature and importance of the message object and the amount of security required for the secure access system 200.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software (e.g., as instructions stored on a computer-readable medium) using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for optimizing data messaging in a secure access system having at least one non-networked reader. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving message host information;
receiving message carrier information, wherein a message carrier comprises a handheld and portable access control credential capable of storing a message object and communicating the message object to a message host when a user presents the message carrier to the message host, thereby enabling the message carrier to carry message objects between message hosts, wherein at least one of the message hosts comprises a non-networked access control message host;
analyzing, with a network analysis module, the message host and message carrier information to determine at least one of (i) an amount of time required for a first message object to be communicated to a predetermined number of non-networked message hosts and/or a predetermined number of message carriers and (ii) a number of non-networked message hosts and/or number of message carriers that will receive the first message object within a predetermined amount of time; and
providing, with the network analysis module, an output to a user indicating results of the analyzing step.

2. The method of claim 1, wherein the message object comprises a machine readable message.

3. The method of claim 1, wherein the message host information comprises actual locations and network capabilities for message hosts in an access control system, and wherein message carrier information comprises an actual number of message carriers associated with the access control system.

4. The method of claim 1, wherein the output comprises dissemination statistics for the first message object.

5. The method of claim 4, wherein dissemination statistics comprise at least one of (a) a probability that the first message object will reach a first message host within the required time, (b) an indication of time needed for the first message object to reach the first message host within a predetermined probability, (c) a probability that the first message host will not receive the message object, and (d) a probability that a first message carrier will not receive the message object.

6. The method of claim 1, wherein the output comprises suggestions to optimize dissemination of the first message object to the predetermined number of message hosts.

7. The method of claim 6, wherein the suggestions to optimize dissemination of the first message object include at least one of (a) a suggested message host on which to introduce the first message object to an access control system, (b) a suggested message carrier on which to introduce the first message object to the access control system, and (c) a suggested delayed update.

8. The method of claim 7, wherein the suggestions to optimize dissemination of the first message object comprise a suggested delayed update and wherein the first message object comprises a timer mechanism that activates the first message object at a predetermined time after the first message object has been introduced into the access control system.

9. The method of claim 1, wherein message hosts comprise RFID access control readers, wherein message carriers comprise portable RFID access control credentials, and wherein the first message object comprises policy information for the access control readers including an access control update changing access rights for at least one access control credential to access at least one asset associated with an access control reader.

10. The method of claim 1, wherein the output comprises an expected minimum number of delivery steps needed to convey a first message object from an originating access control device to a target access control device.

11. The method of claim 1, wherein the analyzing step comprises at least one of:
 reading a log file of at least one of a message host and message carrier;
 calculating a weighted adjacency matrix for an event time corresponding to the required time;
 calculating a distribution for data flow between message hosts and message carriers;
 identifying message carriers that will contact each message host during the event time;
 identifying message hosts that will be contacted by each message carrier during the event time;
 identifying clusters of message carriers that will contact a predetermined number of message hosts during the event time;
 identifying clusters of message hosts that will be contacted by a predetermined number of message carriers during the event time; and
 calculating a propagation rate for the first message object during the event time, wherein the propagation rate is based on message initiation at one or more access control devices.

12. A non-transitory computer readable medium comprising processor executable instructions that, when executed, perform the method of claim 1.

13. A method, comprising:
 receiving message host information;
 receiving message carrier information, wherein message carriers comprise at least one portable medium capable of storing a message object and communicating the message object to a message host thereby enabling the message carrier to carry message objects between message hosts, wherein at least one of the message hosts comprises a non-networked message host;
 analyzing, with a network analysis module, the message host and message carrier information to determine at least one of (i) an amount of time required for a first message object to be communicated to a predetermined number of message hosts and/or a predetermined number of message carriers and (ii) a number of message hosts and/or message carriers that will receive the first message object within a predetermined amount of time;
 providing, with the network analysis module, an output to a user indicating results of the analyzing step;
 receiving message dissemination requirements that define the required time in which the predetermined number of message hosts and/or message carriers should receive a message object;
 determining whether the first message object will be disseminated to at least the predetermined number of message hosts and/or message carriers within the required time; and
 including in the output results of the determining step.

14. The method of claim 13, wherein the message host information comprises proposed locations and network capabilities for message hosts in an access control system, wherein message carrier information comprises a proposed number of message carriers associated with the access control system, wherein the non-networked message host relies on the message carriers to receive the first message object and share other message objects with other non-networked message hosts, and wherein the output comprises at least one of (a) a suggested different location for at least one message host, (b) a suggested different network capability for at least one message host, and (c) a suggested different number of message carriers.

15. The method of claim 14, wherein the output comprises a different network capability for at least one identified message host and wherein the different network capability comprises providing a direct communication link between the identified at least one message host and another network device in the access control system.

16. A device, comprising:
 memory for storage of program instructions and a processor for executing the program instructions stored in the memory, the program instructions including:
 a network analysis module operable to analyze information flows in an access control system comprising a plurality of message hosts, at least one of which is a non-networked access control message host, and a plurality of message carriers operable to carry message objects between message hosts as users carry message carriers between message hosts and present message carriers to message hosts, wherein the network analysis module is further operable to determine and provide, as an output, at least one of (i) an amount of time required for a first message object to be communicated to a predetermined number of non-networked message hosts and/or a predetermined number of message carriers and (ii) a number of non-networked message hosts and/or number of message carriers that will receive the first message object within a predetermined amount of time.

17. The device of claim 16, wherein the network analysis module is further operable to receive message dissemination requirements that define the required time in which the predetermined number of message hosts and/or message carriers should receive a message object, determine whether the first message object will be disseminated to at least the predetermined number of message hosts and/or message carriers within the required time and include results of the determination in the output.

18. The device of claim 17, wherein the network analysis module is further configured to analyze message host information which comprises proposed locations and network capabilities for message hosts in an access control system, wherein message carrier information comprises a proposed number of message carriers associated with the access control system, wherein the output comprises at least one of (a) a suggested different physical location for at least one message host, (b) a suggested different network capability for at least one message host, and (c) a suggested different number of message carriers.

19. The device of claim 18, wherein the output comprises a different network capability for at least one identified message host and wherein the different network capability comprises providing a direct communication link between the identified at least one message host and another network device in the access control system.

20. The device of claim 16, wherein the message object comprises a machine readable message.

21. The device of claim 16, wherein information analyzed by the network analysis module includes message host information and message carrier information, wherein the message host information comprises actual locations and network capabilities for message hosts in an access control system, and wherein message carrier information comprises an actual number of message carriers associated with the access control system.

22. The device of claim 16, wherein the output comprises dissemination statistics for the first message object, wherein dissemination statistics comprise at least one of (a) a probability that the first message object will reach a first message host within the required time, (b) an indication of time needed for the first message object to reach the first message host within a predetermined probability, (c) a probability that the first message host will not receive the message object, and (d) a probability that a first message carrier will not receive the message object.

23. The device of claim 16, wherein the output includes suggestions to optimize dissemination of the first message object, which include at least one of (a) a suggested message host on which to introduce the first message object to an access control system, (b) a suggested message carrier on which to introduce the first message object to the access control system, and (c) a suggested delayed update.

24. The device of claim 23, wherein the suggestions to optimize dissemination of the first message object comprise a suggested delayed update and wherein the first message object comprises a timer mechanism that activates the first message object at a predetermined time after the first message object has been introduced into the access control system.

25. The device of claim 16, wherein message hosts comprise RFID access control readers, wherein message carriers comprise portable RFID access control credentials, and wherein the first message object comprises policy information for the access control readers including an access control update changing access rights for at least one access control credential to access at least one asset associated with an access control reader.

26. The device of claim 16, wherein the output comprises an expected minimum number of delivery steps needed to convey the first message object from an originating access control device to a target access control device.

27. The device of claim 16, wherein the network analysis module is further operable to perform at least one of the following:
- read a log file of at least one of a message host and message carrier;
- calculate a weighted adjacency matrix for an event time corresponding to the required time;
- calculate a distribution for data flow between message hosts and message carriers;
- identify message carriers that will contact each message host during the event time;
- identify message hosts that will be contacted by each message carrier during the event time;
- identify clusters of message carriers that will contact a predetermined number of message hosts during the event time;
- identify clusters of message hosts that will be contacted by a predetermined number of message carriers during the event time; and
- calculate a propagation rate for the first message object during the event time, wherein the propagation rate is based on message initiation at one or more access control devices.

* * * * *